United States Patent
Kasuga et al.

(10) Patent No.: US 7,716,293 B2
(45) Date of Patent: May 11, 2010

(54) PRESENCE INFORMATION SHARING METHOD AND SYSTEM

(75) Inventors: Kenji Kasuga, Tokyo (JP); Tatsuhiko Miyata, Kokubunji (JP); Mitsuru Ikezawa, Sagamihara (JP); Kazuyoshi Hoshino, Komae (JP)

(73) Assignee: Hitachi, Ltd., Tokyo (JP)

( * ) Notice: Subject to any disclaimer, the term of this patent is extended or adjusted under 35 U.S.C. 154(b) by 1109 days.

(21) Appl. No.: 11/079,274

(22) Filed: Mar. 15, 2005

(65) Prior Publication Data
US 2005/0210113 A1    Sep. 22, 2005

(30) Foreign Application Priority Data
Mar. 16, 2004    (JP)    ............................... 2004-074179

(51) Int. Cl.
*G06F 15/16* (2006.01)
(52) U.S. Cl. ....................... 709/206; 709/204; 709/205; 709/207
(58) Field of Classification Search ................. 709/223, 709/224, 204, 205, 207
See application file for complete search history.

(56) References Cited

U.S. PATENT DOCUMENTS 6,697,840 B1 * 2/2004 Godefroid et al. ........... 709/205
2003/0065788 A1 * 4/2003 Salomaki ..................... 709/227
2005/0066018 A1 * 3/2005 Whittle et al. ............... 709/223

FOREIGN PATENT DOCUMENTS

WO    02/073461    9/2002

OTHER PUBLICATIONS

S. Okumura, et al., "Technical Commentary—SIS (Session Initiation Protocol)", Nikkei Communications, Sep. 22, 2003, pp. 150-158.

* cited by examiner

*Primary Examiner*—Rupal D Dharia
*Assistant Examiner*—Adnan Mirza
(74) *Attorney, Agent, or Firm*—Antonelli, Terry, Stout & Kraus, LLP.

(57) ABSTRACT

Presence information is shared between a plurality of applications, to grasp a change of presence information of a different kind of application.

An IM(X) server 3 receives a notification of a change of presence information from a client A1 (S902), and sends a change notification message for notifying the change of the presence information to a presence server 5 (S906). Then, the presence server 5 sends the change notification message received from the IM(X) server 3 to the IM(Y) server 4 (S908). The IM(Y) server 4 sends the change notification message received from the presence server 5 to a client B2 (S910).

6 Claims, 9 Drawing Sheets

FIG. 4

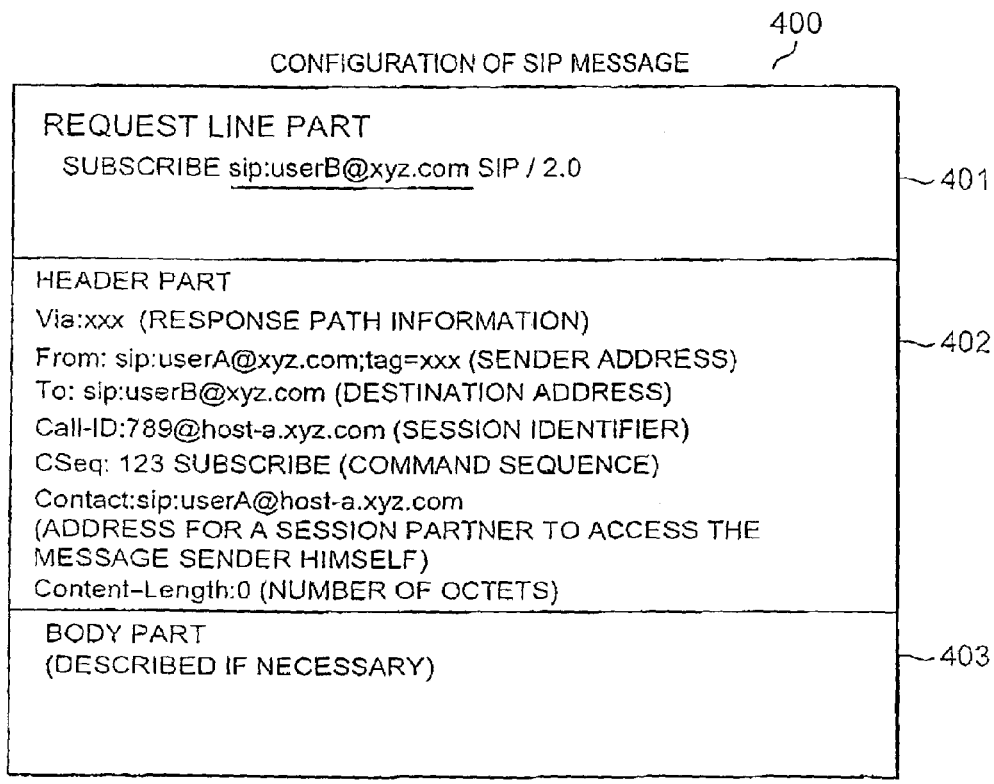

CONFIGURATION OF SIP MESSAGE 400

REQUEST LINE PART
　SUBSCRIBE sip:userB@xyz.com SIP / 2.0 　~401

HEADER PART
Via:xxx (RESPONSE PATH INFORMATION)
From: sip:userA@xyz.com;tag=xxx (SENDER ADDRESS)
To: sip:userB@xyz.com (DESTINATION ADDRESS)
Call-ID:789@host-a.xyz.com (SESSION IDENTIFIER)
CSeq: 123 SUBSCRIBE (COMMAND SEQUENCE)
Contact:sip:userA@host-a.xyz.com
(ADDRESS FOR A SESSION PARTNER TO ACCESS THE MESSAGE SENDER HIMSELF)
Content-Length:0 (NUMBER OF OCTETS)　~402

BODY PART
(DESCRIBED IF NECESSARY)　~403

FIG. 5A

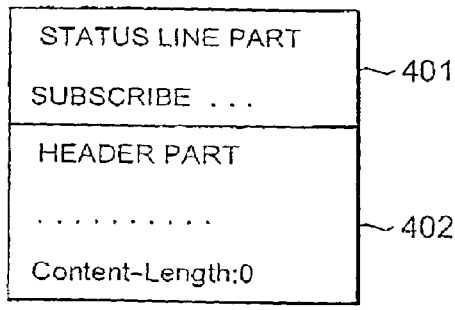

CONVENTIONAL SUBSCRIBE MESSAGE

STATUS LINE PART
SUBSCRIBE . . .　~401

HEADER PART
. . . . . . . . .
Content-Length:0　~402

FIG. 5B

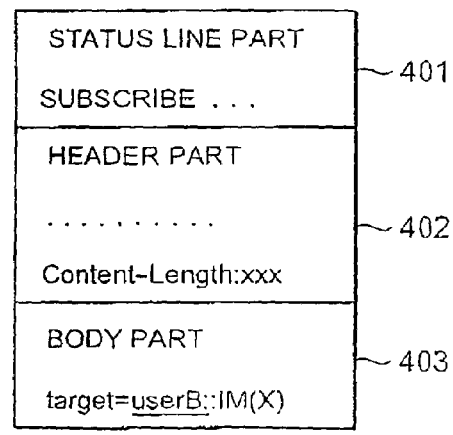

EXTENDED SUBSCRIBE MESSAGE

STATUS LINE PART
SUBSCRIBE . . .　~401

HEADER PART
. . . . . . . . .
Content-Length:xxx　~402

BODY PART
target=userB::IM(X)　~403

FIG. 10

PRESENCE INFORMATION TABLE
OF THE INITIALIZED STATE

ALL SERVERS

| USER INFORMATION | STATUS OF IM(X) | STATUS OF IM(Y) |
|---|---|---|
| USER A | STANDBY | STANDBY |
| USER B | STANDBY | STANDBY |

300

PRESENCE INFORMATION TABLE
AFTER PROCESSING OF S903

FIG. 11A
IM(X) SERVER

| USER INFORMATION | STATUS OF IM(X) | STATUS OF IM(Y) |
|---|---|---|
| USER A | CHATTING | STANDBY |
| USER B | STANDBY | STANDBY |

11a, 300

FIG. 11B
IM(Y) SERVER

| USER INFORMATION | STATUS OF IM(X) | STATUS OF IM(Y) |
|---|---|---|
| USER A | STANDBY | STANDBY |
| USER B | STANDBY | STANDBY |

300

FIG. 11C
PRESENCE SERVER

| USER INFORMATION | STATUS OF IM(X) | STATUS OF IM(Y) |
|---|---|---|
| USER A | STANDBY | STANDBY |
| USER B | STANDBY | STANDBY |

300

FIG. 12A
IM(X) SERVER

PRESENCE INFORMATION TABLE
AFTER PROCESSING OF S907

| USER INFORMATION | STATUS OF IM(X) | STATUS OF IM(Y) |
|---|---|---|
| USER A | CHATTING | STANDBY |
| USER B | STANDBY | STANDBY |

300

FIG. 12B
IM(Y) SERVER

| USER INFORMATION | STATUS OF IM(X) | STATUS OF IM(Y) |
|---|---|---|
| USER A | STANDBY | STANDBY |
| USER B | STANDBY | STANDBY |

300

FIG. 12C
PRESENCE SERVER

| USER INFORMATION | STATUS OF IM(X) | STATUS OF IM(Y) |
|---|---|---|
| USER A | CHATTING — 12c | STANDBY |
| USER B | STANDBY | STANDBY |

300

PRESENCE INFORMATION TABLE
AFTER PROCESSING OF S909

FIG. 13A
IM(X) SERVER

| USER INFORMATION | STATUS OF IM(X) | STATUS OF IM(Y) |
|---|---|---|
| USER A | CHATTING | STANDBY |
| USER B | STANDBY | STANDBY |

300

FIG. 13B
IM(Y) SERVER

| USER INFORMATION | STATUS OF IM(X) | STATUS OF IM(Y) |
|---|---|---|
| USER A | CHATTING — 13b | STANDBY |
| USER B | STANDBY | STANDBY |

300

FIG. 13C
PRESENCE SERVER

| USER INFORMATION | STATUS OF IM(X) | STATUS OF IM(Y) |
|---|---|---|
| USER A | CHATTING | STANDBY |
| USER B | STANDBY | STANDBY |

300

PRESENCE INFORMATION SHARING METHOD AND SYSTEM

BACKGROUND OF THE INVENTION

The present invention relates to a technique of sharing presence information in instant messaging.

Recently, a technique of instant messaging (so-called text chat) for sending an inputted text to another terminal in real time is rapidly coming into wide use (See NIKKEI COMMUNICATION 2003.9.22, P150-P158, "Technical Commentary—SIP (Session Initiation Protocol)" (hereinafter, referred to as "Non-patent Document 1")). Although it is needless to say that the technique of instant messaging is used for personal purposes, various methods are being studied for applying this technique in business situations such as communication from a staff member on a business trip, an online conference for a project, and the like. The technique of instant messaging employs SIMPLE (SIP for instant Messaging and Presence Leveraging Extension), which is an extension of SIP (Session Initiation Protocol). SIP is prescribed in RFC3261 issued by a standardization group, IETF (Internet Engineering Task Force).

SUMMARY OF THE INVENTION

The instant messaging technique has a function of managing presence information that indicates a status of a communication partner. Management of the presence information indicating a status of a communication partner is performed with respect to each application using the instant messaging technique. As a result, in the case where kinds of applications are used, it is possible to know presence information of a communication partner using the same kind of application. However, it is not possible to know presence information of a communication partner who is using a different kind of application For example, when it is assumed that a user A changes his presence information through an application X, a user B can not know the presence information of the user A through another application Y. Accordingly, to know the change of the presence information of the user A, it is necessary to activate the same kind of application, i.e., the application X.

The present invention has been made taking the above situation into consideration. An object of the present invention is to make it possible to share presence information among applications using the instant messaging technique and to grasp a change of presence information through a different kind of application.

To solve the above problems, the present invention employs a presence server so that applications can share all presence information.

For example, a presence information sharing system comprises a plurality of service servers each providing a certain service to a client and a presence server that manages presence information of a user. A processing unit of each of the service servers executes: a reception step, in which a change of presence information with respect to the service provided by the service server concerned is received from the client; a first change notification sending step, in which a change notification for notifying the change of the presence information, received in the reception step, is sent to the presence server; and a second change notification sending step, in which a change notification message for notifying a change of presence information with respect to a service different from the service provided by the service server in question is received and the change notification message is sent to the client. The presence server comprises a processing unit and a storage unit for storing presence information of each user for each service provided by the service servers. The processing unit of the presence server executes: an update step, in which the presence information stored in the storage unit is updated based on a change notification message sent from each of the service servers; and a third change notification sending step, in which a change notification message for notifying the presence information updated in the update step to service servers that provide services different from the service of the updated presence information.

According to the present invention, it is possible to share presence information among a plurality of applications using the instant messaging technique and to grasp a change of presence information of a different application.

BRIEF DESCRIPTION OF THE DRAWINGS

FIG. 4 is a diagram showing an example of a SIP message, FIGS. 5A and 5B are diagrams showing an example of a conventional SUBSCRIBE message and an example of an extended SUBSCRIBE message;

FIG. 10 is diagram showing an example of a presence information table in an initialized state;

FIGS. 11A to 11C are diagrams showing an example of presence information tables in the course of processing;

FIGS. 12A to 12C are diagrams showing an example of presence information tables in the course of processing; and FIGS. 13A to 13C are diagrams showing an example of presence information tables in the course of processing.

DETAILED DESCRIPTION

Now, embodiments of the present invention will be described.

Figure 1:
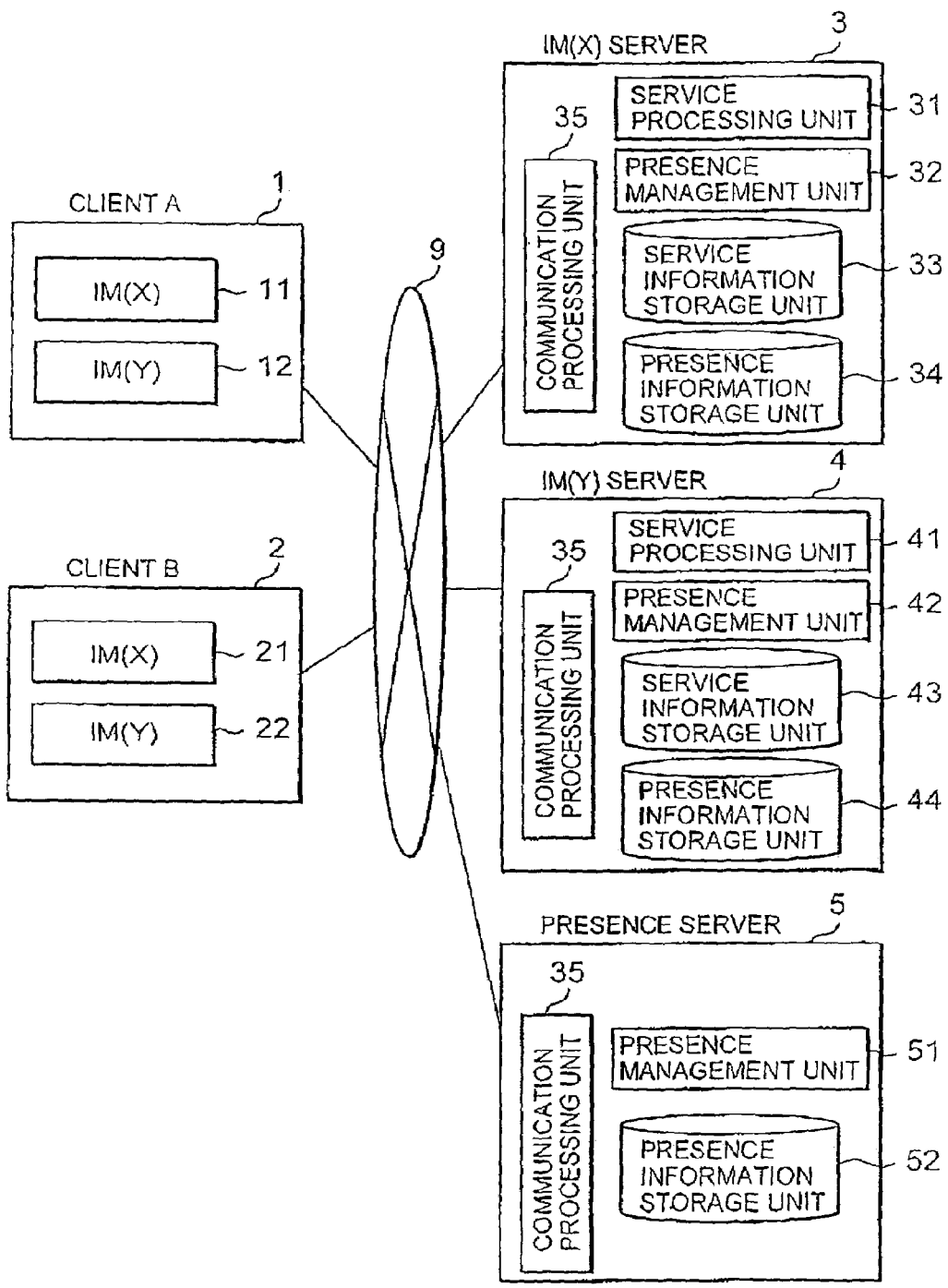
FIG. 1 is a block diagram showing a presence information sharing system to which one embodiment of the present invention is applied.

FIG. 1 is a block diagram showing a presence information sharing system to which one embodiment of the present invention is applied. As shown in the figure, the presence information sharing system of the present embodiment comprises a client A1, a client B2, an instant message X server 3 (hereinafter, referred to as the IM(X) server 3), an instant message Y server 4 (hereinafter, referred to as the IM(Y) server 4), and a presence server 5. These apparatuses are connected through a network 9 such as Internet, an intranet, or the like.

The client A1 is an information processing apparatus used by a user A, and can use kinds of instant messaging services (so-called text chat). An instant messaging service is a service that displays an inputted text in real time on an output unit of a client as a communication partner and has a function of knowing a status of a terminal of a communication partner.

The instant messaging service can cooperate with another application such as an online game, Internet telephony, video conference, and the like.

In the present embodiment, it is assumed that the client A1 has two kinds of application software (instant messengers), IM(X) 11 and IM(Y) 12. Further, it is assumed that text chat, video chat, an online game or the like is performed between instant messengers of the same kind The client B2 is au information processing apparatus used by a user B, and has the same configuration as the client A1. Namely, the client B has two kinds of application software, IM(X) 21 and IM(Y) 22.

The IM(X) server 3 is an information processing apparatus that provides a certain instant messaging service to the client A1 and the client B2 connected to the IM(X) server 3 itself. The IM(X) server 3 comprises: a service processing unit 31 that provides a certain service such as text chat, video chat, an online game, or the like to each client 1 or 2; a presence management unit 32 that manages a status of a user; a service information storage unit 33 for storing data required for the service processing unit to provide its service; a presence information storage unit 34 for storing presence information described below referring to FIG. 3; and a communication processing unit 35 that sends and receives data to and from another apparatus through the network 9. The IM(Y) server 4 is an information processing apparatus that provides a different instant messaging service from the service of the IM(X) server 3, and the configuration of the IM(Y) 4 is similar to the one of the IM(X) server 3.

The presence server 5 is an information processing apparatus that collects presence information (described below) from the IM(X) server 3 and the IM(Y) server 4 for the purpose of sharing the presence information between the servers 3 and 4 The presence server 5 comprises: a presence management unit 51 that collects presence information from the IM(X) server 3 and the IM(Y) server 4; a presence information storage unit 52 for storing presence information (described below referring to FIG. 3); and a communication processing unit 53 that sends and receives data to and from another apparatus through the network 9.

The present embodiment has two clients 1 and 2 and two IM servers 3 and 4. However, there may exist three or more clients or IM servers. In addition, a plurality of presence servers 5 may exist.

Figures 2, 3:
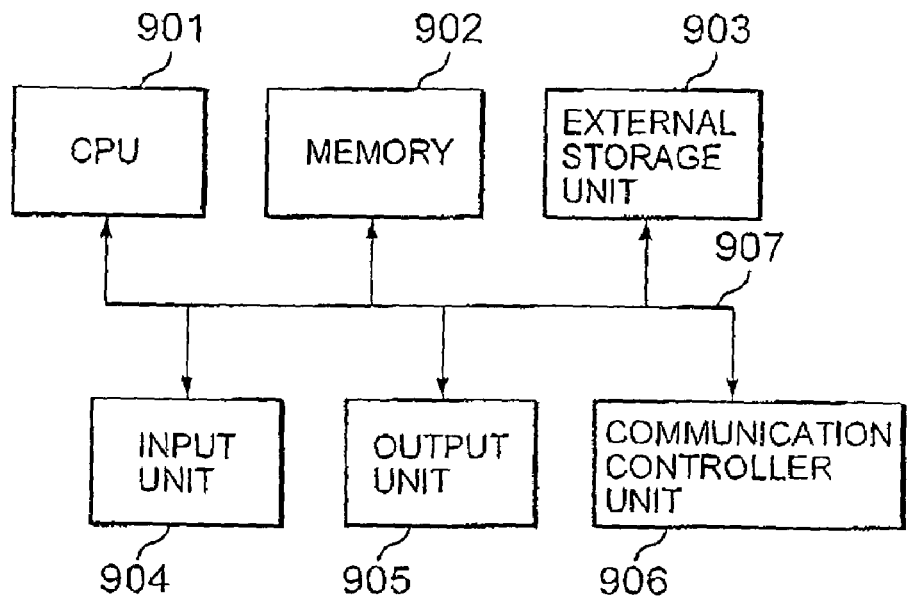
FIG. 2 is a diagram showing a hardware configuration of a client, an IM(X) server, an IM(Y) server or a presence server.
FIG. 3 is a diagram showing an example of a presence information table.

As each of the above-described clients 1 and 2, IM servers 3 and 4 and presence server 5, may be used a general purpose computer system as shown in FIG. 2, comprising a CPU 901, a memory 902 such as a RAM, an external storage unit 903 such as an HDD, an input unit 904 such as a keyboard or a mouse, an output unit 905 such as a display or a printer, a communication controller unit 906 for connecting with a network, and a bus 907 for connecting these devices, for example. Functions of the above-mentioned apparatuses are each realized on such a computer system when the CPU 901 executes a certain program loaded on the memory 902.

For example, each function of the clients 1 and 2, IM servers 3 and 4 and the presence server 5 is realized when the CPU 901 of the client 1 or 2 executes a program for the client 1 or 2, or when the CPU 901 of the IM server 3 or 4 executes a program for the IM server 3 or 4, or when the CPU 901 of the presence server 5 executes a program for the presence server 5. In this case, the memory 902 or the external storage unit 903 of the IM server 8 or 4 is used as the service information storage unit 33 or 43 and the presence information storage unit 34 or 44 of the IM server 3 or 4. Further, the memory 902 or the external storage unit 903 of the presence server 5 is used as the presence information storage unit 52 of the presence server 5.

Next, will be described the presence information. The presence information indicates a status of a user (or the client 1 or 2 used by a user).

FIG. 3 shows an example of a presence information table 300 that uses the table structure to indicate presence information for each kind of instant messaging service used by each user. As shown in the figure, the presence information table 300 has user information 301 as information for identifying a user, and a status 302 of IM(X) and a status 303 of IM(Y) of each user. With respect to the user A, the example of FIG. 3 shows that the status of IM(X) 11 is "chatting" and the status of IM(Y) 12 is "standby". Further, with respect to the user B, the example shows that the status of IM(X) 21 is "standby" and the status of XM(Y) is "chatting".

As categories of status, the present embodiment uses two categories, i.e. "standby" and "chatting". However, it is possible to use other categories such as "playing a game", "video chatting", "being out", "staying at desk", and the like, according to a service provided by the instant messaging. Further, the present embodiment describes the case of two users, the user A using the client A and the user B using the client B. However, in the case where another user uses this presence information sharing system, the presence information of that user is generated also. Further, the presence information table 300 is stored in the respective presence information storage units 34, 44 and 52 of the IM(X) server 3, the IM(Y) server 4 and the presence server 5.

Next, will be described a SIP message.

In the present embodiment, SIMPLE (SIP for instant Messaging and Presence Leveraging Extension), which is an extension of SIP, is used for sending and receiving presence information. SIP (Session Initiation Protocol) is a protocol used for call control of establishing/changing/ending a multimedia communication (session) including voice, video and text through an IP network. SIMPLE is extended from SIMP to send and receive presence information and instant message information.

FIG. 4 shows a configuration of an ordinary SIP message. As shown in the figure, a SIP message has a request line part 401, a header part 402 and a body part 403. The request line part 401 describes such information as a "method" indicating a purpose (a type) of a request, "Request URI" indicating a destination as a communication partner, and the like. In the example shown, its method is "SUBSCRIBE".

The header part 402 describes information on a client that has issued the message and information used for the SIP protocol. For example, as shown in the figure, the header part 402 describes "Via" indicating a response path, "From" indicating a sender, "To" indicating a destination address, "Call-ID" indicating a session identifier, "CSeq" indicating a command sequence, "Contact" indicating an address for a session partner to access the message sender himself, "Content-Length" indicating the number of octets of the body part 403, and the like. The body part 403 describes a medium that can be used, parameters, and the like, if necessary.

For sending and receiving presence information, is used a message whose request part 401 describes the "SUBSCRIBE" method or the "NOTIFY" method prescribed in SIMPLE The method "SUBSCRIBE" is a change notification request method, which is used for requesting a communication partner in advance to notify a change of the presence information (status) of the communication partner each time. The method "NOTIFY" is a method used for notifying a change of presence information (status) to a communication partner who has sent a change notification request using "SUBSCRIBE". Thus, to acquire presence information of a communication partner, a client 1 or 2 previously sends a SUBSCRIBE message whose "Request URI" designates the URI of the communication partner to an IM servers 3 or 4 (Or, the URI of the communication partner may be designated in "To" of the header part 402) Thereafter, each time the status of the communication partner changes, for example, owing to log-in of the client as the communication partner, the client 1 or 2 as the communication partner notifies the presence information (status) to the IM servers 3 or 4. Then, the IM servers 3 or 4 sends a NOTIFY message to notify the status change of the communication partner to the client 1 or 2 that has sent the SUBSCRIBE message.

In the case of a conventional SUBSCRIBE message, its request line part describes "Request URI" indicating a destination of a user as a communication partner, as shown in FIG. 4 (Or, the destination may be described in "To" of the header part 402). As a result, a change notification request is designated for one user. In other words, even in the case where a user as a communication partner uses a plurality of instant messaging services and presence information (status) changes with respect to only one of the instant messaging services, all pieces of presence information (all the statuses) of the instant messaging services that the user uses are notified using a NOTIFY message. In the case of the example shown, "user B" is the object of the change notification request. Further, a conventional SUBSCRIBE message does not use the body part 403. Accordingly, "Content-Length" of the header part is always set with "0".

The present invention extends SUBSCRIBE prescribed by SIMPLE, and uses the body part 403 to designate details of the object of the change notification request. Namely, a user as the object of the change notification request and an instant messaging service are set in the body part 403. Accordingly, when the presence information of the instant messaging service designated in the body part 403 changes among various pieces of presence information of the user as the object of the change notification request, then only the changed presence information of the instant messaging service is notified using a NOTIFY message.

FIGS. 5A and 5B show a conventional SUBSCRIBE message and a SUBSCRIBED message extended by the present invention. FIG. 5A shows au example of a conventional SUBSCRIBE message. As shown in the figure, "Content-Length" of the header part 402 of the message shown in FIG. 5A is set with "0", and the message part 403 does not exit.

On the other hand, FIG. 5B shows an example of an extended SUBSCRIBE message. In the header part 402 of the message shown in FIG. 5B, "Content-Length" is set with a value other than "0", and the message part 403 describes a user as the object of the change notification request and the instant messaging service as the object of the change notification request. The shown example requests a notification of a change of only the presence information of IM(X) of "user B".

Next, will be described processing performed in each of the IM(X) server 3, the IM(Y) server 4 and the presence server 5 when a SUBSCRIBE message is received.

Figure 6:
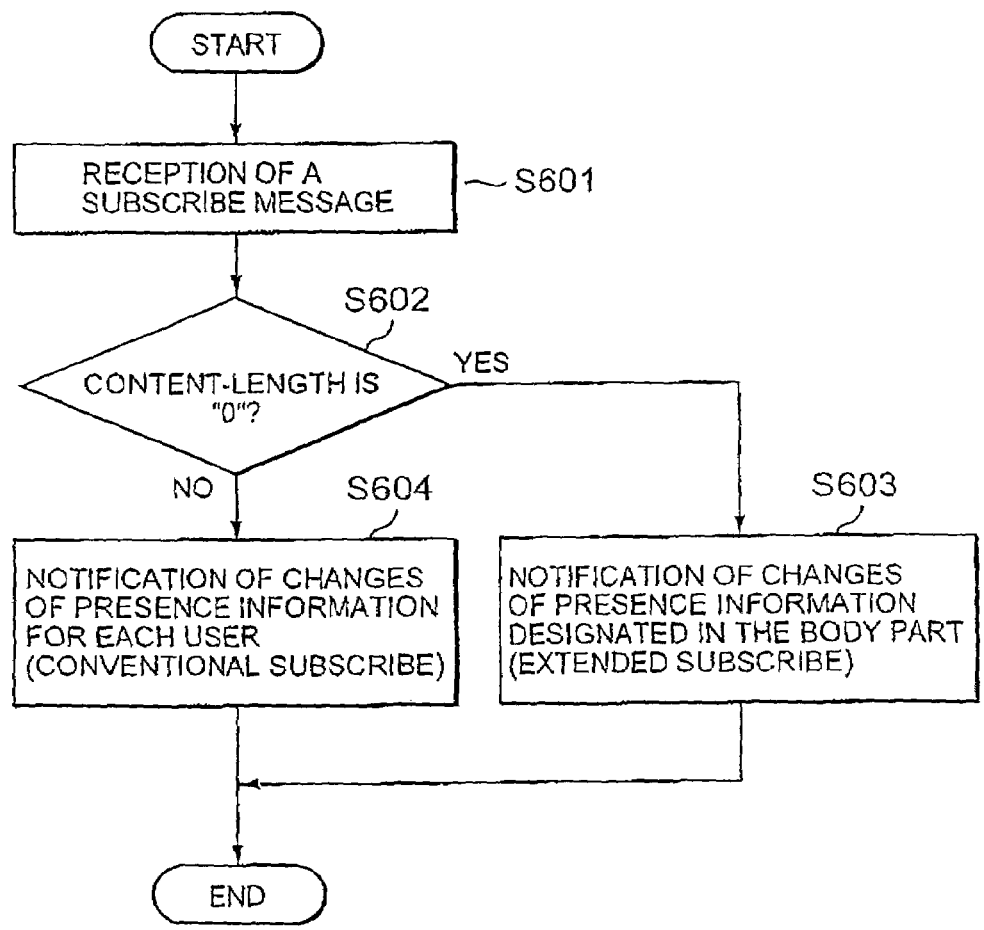
FIG. 6 is a flowchart showing processing in each server when a SUBSCRIBE message is received.

FIG. 6 is a flowchart showing processing in each server 3, 4 or 5. In the following, the IM(X) server 3 is taken as an example. The similar processing is performed also in the IM(Y) server 4 and the presence server 5. First, the presence management unit 32 receives a SUBSCRIBE message through the communication processing unit 34 (S601). Then, the presence management unit 32 refers to "Content-Length" of the header part 402 of the received message, to judge whether "0" is set to "Content-Length" (S602). In the case where "Content-Length" is set with "0" (S602: YES), the presence management unit 32 notifies a change of presence information with respect to one user designated in "Request URI" in the request line part 401 to the communication partner who has sent the SUBSCRIBE message (S603). Namely, this is processing of a conventional SUBSCRIBE message. And when any piece of presence information of the object user is changed, all pieces of presence information of that user are sent using a NOTIFY message.

On the other hand, in the case where "Content-Length" is set with a value other than "0" (S602: NO), then the presence management unit 32 refers to the body part 403. Only when the presence information of the instant messaging service designated in the body part 403 is changed, the change of the presence information in question is notified to the communication partner who has sent the SUBSCRIBE message (S604). Namely, this is processing of an extended SUBSCRIBE message. And, among the presence information of the object user, only the presence information of the instant messaging service designated in the body part 403 is sent using a NOTIFY message when that presence information is changed.

Thus, each server 3, 4 ox 5 can judge whether the conventional SUBSCRIBE processing should be performed or the extended SUBSCRIBE processing should be performed, depending on whether "Content-Length" of a SUBSCRIBE message is set with "0" or not. As a result, in the presence information sharing system of the present embodiment, a conventional SUBSCRIBE message and an extended SUBSCRIBE message can coexist. Further, using an extended SUBSCRIBE message, it is possible to designate details of objects of a presence information change notification requests and not to notify an unnecessary change of presence information.

Next, will be described a display screen (GUI: Graphical User Interface) of an instant messaging service of IM(X) or IM(Y), which is displayed on the output unit of the client A1 or the client B2.

Figure 7:
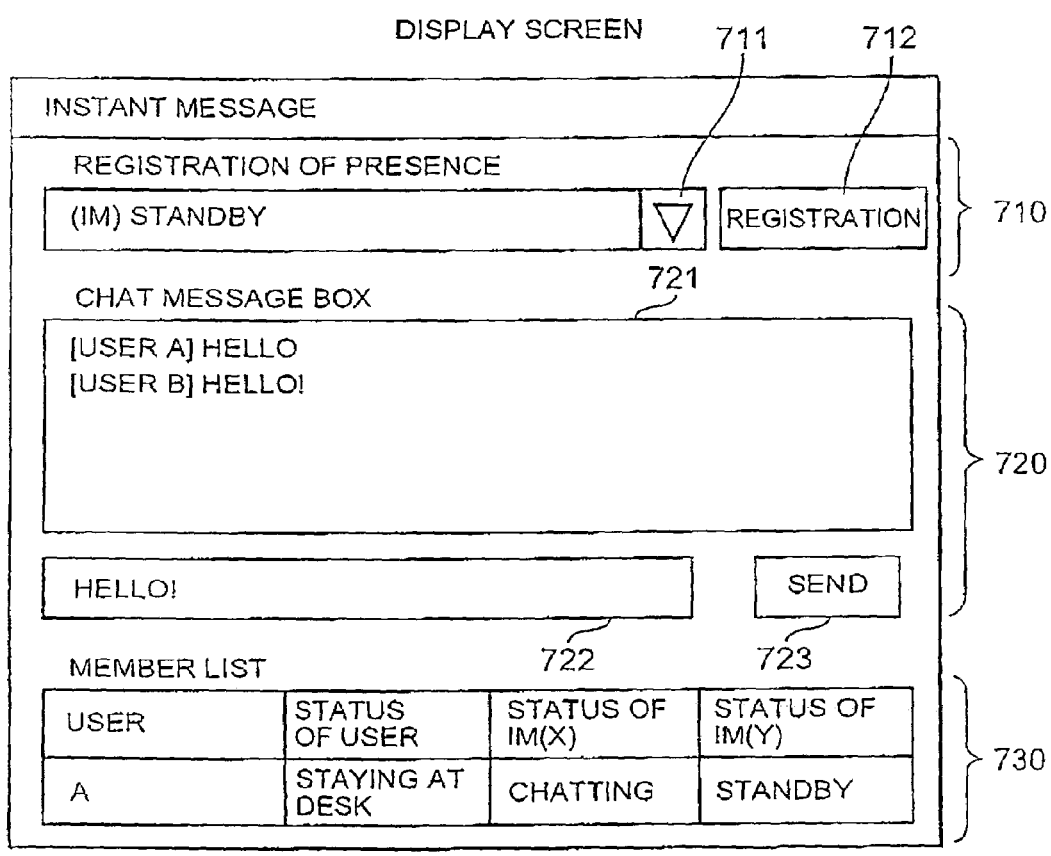
FIG. 7 is a view showing an example of a display screen in an instant messaging service.

FIG. 7 shows an example of a display screen of a text chat instant messaging service. The display screen shown in the figure has a presence information registration part 710, a chat part 720 for text chat, and a member list 730 for displaying presence information of users using the text chat in question.

The presence information registration part 710 receives registration of presence information (such as standby, chatting, or the like, for example), which is set in advance in a pall-down menu 711 or the like, from the input unit 904 of the client A1 or the client B2. When a depression of a registration button 712 is received, the registered presence information is sent to the IM server 3 or 4 that provides the instant messaging service in question.

The chat part 720 has a display area 721 for displaying a text sent by each user using the text chat, an input area 722 for displaying a text inputted by a user using the client in question through the input unit 904, and a send button 723 for sending a text displayed in the input area 722. This text inputted in the input area 722 is sent using a SIP message whose method is "MESSAGE" prescribed in SIMPLE.

The member list 730 displays similar information to information of the presence information table 300 described referring to FIG. 3. Namely, the member list 730 has user information (i.e. information identifying a user) and statuses of IM(X) and IM(Y) of that user. The example of member list 730 shown in FIG. 7 displays presence information of the other users than the user of the client itself. However, it is possible that the member list 730 displays the presence information of the user (the user B, in this case) of the client itself.

Next, will be described processing of a presence information-change notification request using a SUBSCRIBE message.

Figure 8:
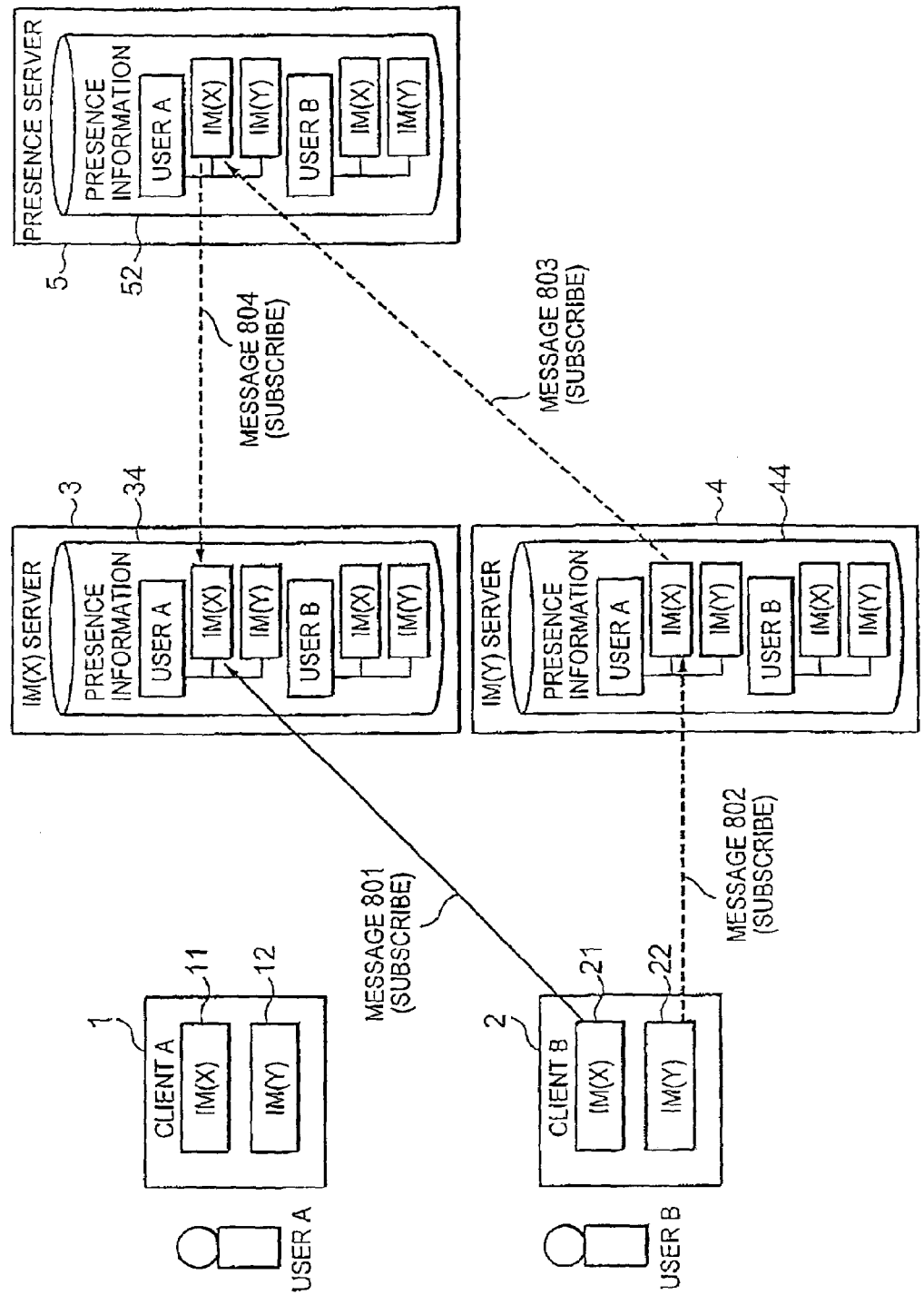
FIG. 8 is a diagram showing a flow of processing of presence information change notification requests using SUBSCRIBE messages.

FIG. 8 shows a flow of SUBSCRIBE messages that are sent in advance in order that a change in XM(X) 11 of the user A can be confirmed through each display screen (See FIG. 7) of IM(X) 2 ox IM(Y) in the client A1 of the user A.

First, the following processing is performed so that IM(X) 21 of the client B2 of the user B acquires the presence information of IM(X) 11 of the client A1 of the user A. Namely, IM(X) 21 of the client B2 sends a SUBSCRIBE message (the message 801) that requests a notification of a change of the presence information of IM(X) 11 of the user A, to the presence management unit 32 of the IM(X) server 3 that provides the instant messaging service of IM(X) 21. In detail, when the power of the client B2 is turned on, or the instant messaging service of IM(X) 21 is activated, a presence management unit (not shown) of IM(X) 21 of the client 332 sends the following message to the IM(X) server 3. This SUBSCRIBE message is an extended SUBSCRIBE message with its "Content-Length" being set with a value other than "0" For the sake of convenience of description, URI (Uniform Resource Identifier) is not used for describing destinations and addresses in "Request URI" of the request line part and "From" and "To" of the header part. Also, for the sake of convenience of description, "Via", "Call-ID" and the like to be described in the header part are omitted.

| [Request line part] | SUBSCRIBE URI of the user A |
| [Header part] | From: URI of the user B |
| | To: URI of the user A |
| | Content-Length: nnn |
| [Body part] | target = the user A::IM(X) |

On the other hand, in order that IM(Y) 22 of the client B2 of the user B acquires the presence information of IM(X) 11 of the client A1 of the user A, it is necessary to send three messages, the message 802, the message 803 and the message 804 shown in the figure. First, the message 802 is a SUBSCRIBE message that IM(Y) 22 of the client B2 sends to the IM(Y) server 4. In detail, when the client B2 is turned on or the instant messaging service of IM(Y) 22 is activated, a presence management unit (not shown) of IM(Y) 22 sends a SUBSCRIBE message similar to the above-mentioned message 801, for requesting a notification of a change of the presence information of IM(X) 11 of the user A, to the presence management unit 42 of the IM(Y) server 4.

Further, the message 803 is a SUBSCRIBE message that the presence management unit 42 of the IM(Y) server 4 sends to the presence server 5. In detail, when the IM(X) server 4 is activated by turning on the power for example, then the presence 10 management unit 42 of the IM(X) server 4 sends the following message to the presence management unit 51 of the presence server 5 for requesting a notification of a change of the presence information of IM(X) 11 of the user A.

| [Request line part] | SUBSCRIBE URI of the user A |
| [Header part] | From: URI of the IM(Y) server |
| | To: URI of the user A |
| | Content-Length: nnn |
| [Body part] | target = the user A::IM(X) |

Further, the message 804 is a SUBSCRIBE message send by the presence management unit 51 of the presence server 5 to the IM(X) server 3. In detail, when the presence server 5 is activated by turning on the power for example, then the presence management unit 51 of the presence server 5 sends the following message to the presence management unit 32 of the IM(X) server 3 for requesting a notification of a change of the presence information of IM(X) 11 of the user A.

| [Request line part] | SUBSCRIBE URI of the user A |
| [Header part] | From: URI of the presence server |
| | To: URI of the user A |
| | Content-Length: nnn |
| [Body part] | target = the user A::IM(X) |

Thus, when IM(X) 21 of the client B2 sends the message 801 in advance, the user B can know a change of the presence information of IM(X) 11 of the user A through the display screen (See FIG. 7) of IM(X) 21. Further, when the IM(Y) 22 of the client B2 sends the message 802 in advance, the IM(Y) server 4 sends the message 803 in advance and the presence server 4 sends the message 804 in advance, the user B can also know a change of the presence information of IM(X) 11 of the user A through the display screen (See FIG. 7) of IM(X) 22. In other words, it is possible to k)now presence information of a different kind of instant messaging service.

Next, will be described processing of a presence information change notification using a NOTIFY message.

Figure 9:
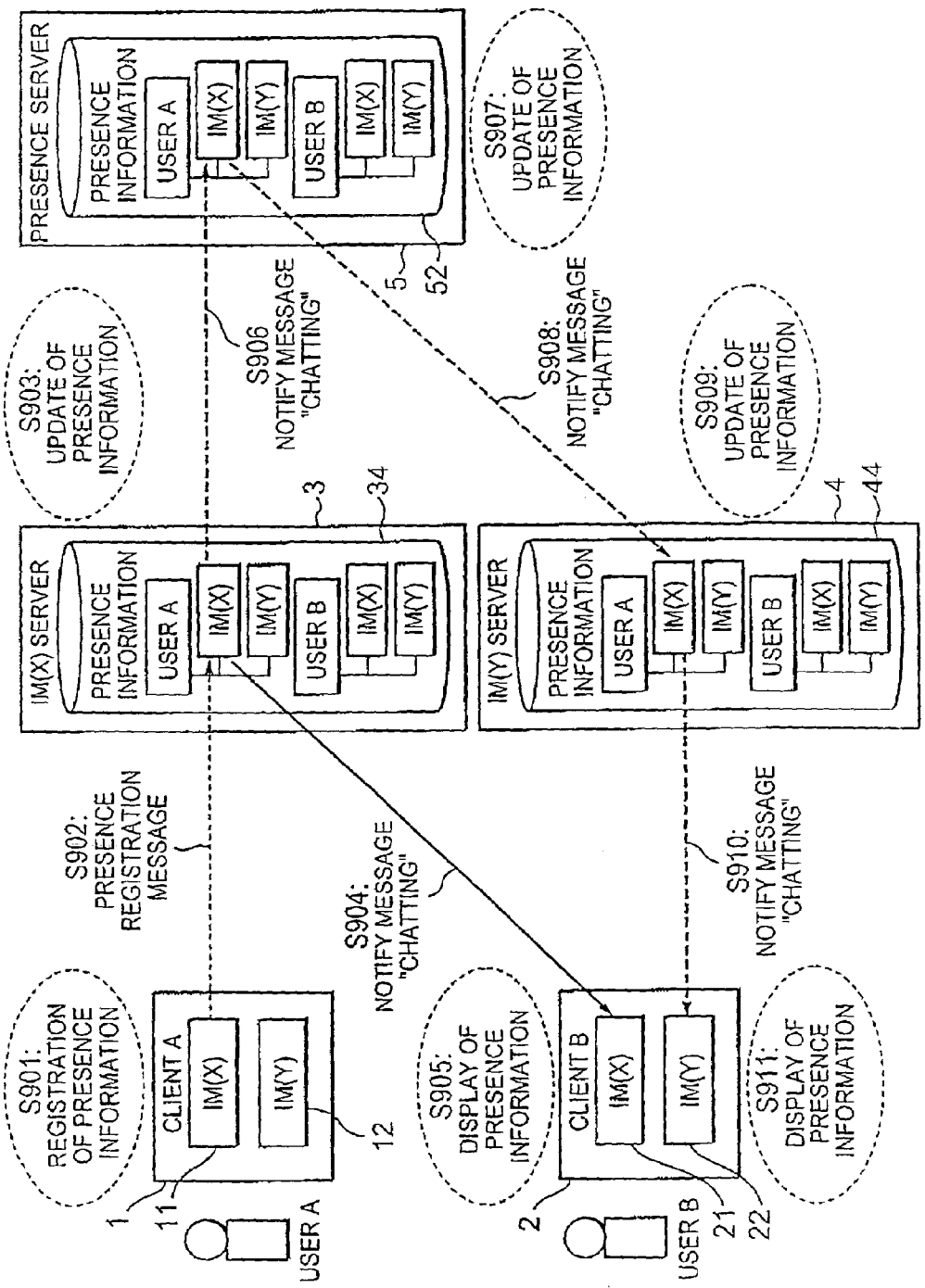
FIG. 9 is a diagram showing a flow of processing of presence information change notifications using NOTIFY messages.

FIG. 9 shows a flow of change notification messages in the case where the user A changes the presence information of IM(X) 11 after the SUBSCRIBE messages (messages 801-804) shown in FIG. 8 are sent in advance. As shown in FIG. 10, it is assumed that all the presence information statuses are "standby" in the presence information tables 300 of the IM(X) server 3, the IM(Y) server 4 and the presence server 5 before the user A changes the presence information of IM(X) 11.

First, the client A1 receives an instruction to change the presence information of IM(X) 11 from the user A (S901). Namely, using the input unit 904 of the client A1, the user A changes his presence information of IM(X) 11 through the display screen (See FIG. 7) of the instant messaging service of IM(X) 11 In this case, the user A registers a change of the presence information of IM(X) from "standby" to "chatting".

Next, a presence management unit (not shown) of the client A1 sends the received presence information to the IM(X) server 3 (S902). Namely, the presence management unit of the client A1 sends a message for registering the changed presence information, to the IM(X) server 3 Here, a message for registering changed presence information is not prescribed in SIP and SIMPLE. Accordingly, the presence information registration message is sent using a SIP message of the request type "PUBLISH" or using another protocol than SIP.

Next, the presence management unit 32 of the IM(X) server 3 updates the presence information table 300 stored in the presence information storage unit 34 (S903). Namely, the presence management unit 32 receives the presence information registration message from IM(X) 11 of the client A1 through the communication processing unit 35. Then, based on the received message, the presence management unit 32 updates the presence information table 300. In this case, the presence management unit 32 changes the status of IM(X) 11 of the user A in the presence information table 300 from "standby" to "chatting".

FIGS. 11A to 11C show the respective presence information tables 300 of the IM(X) server 3, the IM(Y) server 4 and the presence server 5 after the processing of S903. As shown in the figure, only the status of the user A's IM(X) in the IM(X) server 3 has been updated to "chatting" 11a.

Next, the presence management unit 32 of the IM(X) server 3 sends a NOTIFY message for notifying the user A's presence information of IM(X) 11 in the presence information table 300 (S904 and S906). Namely, the presence management unit 32 of the IM(X) server 3 has previously received the SUBSCRIBE messages (the messages 801 and 804) shown in FIG. 8 from the IM(X) 21 of the client B2 and from the presence server 5. Accordingly, since the user A's presence information of IM(X) 11 has been changed, the presence management unit 32 sends a NOTIFY message (S904) to the client B2 and a NOTIFY message (S906) to the presence server 5.

Here, the message that the presence management unit 32 of the IM(X) server 3 has received from IM(X) 21 of the client B2 is an extended SUBSCRIBE message having the body part 403 in which "target" is described. Accordingly, as for the NOTIFY message (S904) to the client B2, the presence management unit 32 notifies only the presence information of IM(X) described in the "target" of the body part 403 among the user A's presence information stored in the presence information table 300. The presence management unit 32 of the IM(X) server 3 sends the following NOTIFY message to IM(X) 21 of the client B2. Here, the user A's presence information of IM(X) is described in the XML format in the body part of the message.

| [Request line part] | NOTIFY the contact address of the user B |
|---|---|
| [Header part] | From: URI of the user A |
| | To: URI of the user B |
| | Content-Length: nnn |
| [Body part] | (description of the status ("chatting") of user A's IM(X)) |

Then, IM(X) 21 of the client )32 receives the NOTIFY message from the IM(X) server 3, and changes the member list 730 in the display screen (See FIG. 7) (which is outputted to the output unit 905) of the instant messaging service of IM(X) 21 (S905). In detail, the status of user A's IM(X) in the member list 730 is changed to "chatting" Through this display screen, the user B can know a change of the status of the user A each time. Further, the presence management unit 32 of the IM(X) server 3 sends the NOTIFY message to the presence server 5 (S906) Here, the message that the presence management unit 32 of the IM(X) server 3 has received from the presence management unit 51 of the presence server 5 is an extended SUBSCRIBE message having the body part 403 in which "target" is described. Accordingly, as for the NOTIFY message (S906) to the presence server 5, the presence management unit 32 of the IM(X) server 3 notifies only the presence information of IM(X) described in the "target" of the body part 403 among the user A's presence information stored in the presence information table 300. Namely, the presence management unit 32 of the IM(X) server 3 sends the following NOTIFY message to the presence server 5. Here, the user A's presence information of IM(X) 11 is described in the XML format in the body part of the message.

| [Request line part] | NOTIFY the contact address of the presence server |
|---|---|
| [Header part] | From: URI of the user A |
| | To: URI of the presence server |
| | Content-Length: nnn |
| [Body part] | (description of the status ("chatting") of user A's IM(X)) |

Next, the presence management unit 51 of the presence server 5 updates the presence information table stored in the presence information storage unit 52 (S907). Namely, the presence management unit 51 receives the NOTIFY message from the, IM(X) server 3 through the communication processing unit 53. Then, based on the received NOTIFY message, the presence management unit 51 updates the presence information table 300. In this case, the presence management unit 51 changes the status of user A's IM(X) 11 in the presence information table 300 from "standby" to "chatting".

FIGS. 12A to 12C show the respective presence information tables 300 of the IM(X) server 3, the IM(Y) server 4 and the presence server 5 after the processing of S907. As shown in the figure, the status of user A's IM(X) 11 has been updated to "chatting" 12c in the presence server 5.

Then, the presence management unit 51 of the presence server 5 sends a NOTIFY message to the IM(Y) server 4 (S908). Namely, the presence management unit 51 of the presence server 5 has previously received the SUBSCRIBE message (FIG. 8: the message 803) from the IM(Y) server 4. Accordingly, since the user A's presence information of IM(X) 11 has been changed, the presence management unit 51 sends a NOTIFY message to the IM(Y) server 4 (S908).

Here, the message that the presence management unit 51 of the presence server 5 has received from the XM(Y) server 4 is an extended SUBSCRIBE message having the body part 403 in which "target" is described. Accordingly, the presence management unit 51 notifies only the user A's presence information of IM(X) 11 described in the "target" of the body part 403 among the user A's presence information stored in the presence information table 300, to the IM(Y) server 4. The presence management unit 51 of the presence server 5 sends the following NOTIFY message to the IM(Y) server 4. Here, the user A's presence information of IM(X) 11 is described in the XML format in the body part of the message

| [Request line part] | NOTIFY the contact address of the user A |
|---|---|
| [Header part] | From: URI of the user A |
| | To: URI of the IM(Y) server |
| | Content-Length: nnn |
| [Body part] | (description of the status ("chatting") of user A's IM(X)) |

Next, the presence management unit 42 of the IM(Y) server 4 updates the presence information table 300 stored in the presence information storage unit 44 (S909). Namely, the presence management unit 42 receives the NOTIFY message from the presence server 5 through the communication processing unit 45. Then, based on the received NOTIFY message, the presence management unit 42 updates the presence information table 300. In this case, the presence management unit 42 changes the status of user A's IM(X) 11 in the presence information table 300 from "standby" to "chatting".

FIGS. 13A to 13C show the respective presence information tables 300 of the IM(X) server 3, the IM(Y) server 4 and the presence server 5 after the processing of S909. As shown in the figure, the status of user A's IM(X) has been updated to "chatting" 13*b*.

Next, the presence management unit 42 of the IM(Y) server 4 sends a NOTIFY message to IM(Y) 22 of the client B2 (S910). Namely, the presence management unit 42 of the IM(Y) server 4 has previously received the SUBSCRIBE message (FIG. 8, the message 802) from IM(Y) 22 of the client B2. Accordingly, since the user A's presence information of IM(X) 11 has been changed, the presence management unit 42 sends a NOTIFY message to the client B2.

Here, the message that the presence management unit 42 of the IM(Y) server 4 has received from IM(Y) 22 of the client B2 is an extended SU)3SCRIBE message having the body part 403 in which "target" is described. Accordingly, the presence management unit 32 notifies only the user A's presence information of IM(X) 11 described in the "target" of the body part 403 among the user A's presence information stored in the presence information table 300, to the client B2. The presence management unit 42 of the IM(Y) server 4 sends the following NOTIFY message to IM(Y) 22 of the client B2. Here, the user A's presence information of IM(X) 11 is described in the XML format in the body part of the message.

| | |
|---|---|
| [Request line part] | NOTIFY the contact address of the user A |
| [Header part] | From: URI of the user A |
| | To: URI of the user B |
| | Content-Length: nnn |
| [Body part] | (description of the status ("chatting") of user A's IM(X)) |

Then, IM(Y) 22 of the client B2 receives the NOTIFY message from the IM(Y) server 4 and changes the member list 730 in the display screen (See FIG. 7) of the instant messaging service IM(Y) 22, which is displayed on the output unit 905 (S911). In detail, the user A's status of IM(X) in the member list 730 is changed to "chatting". Thus, on the display screen of IM(Y) 22, the user B can each time know a change of the presence information (status) of the user A using IM(X) 21 that is a different kind of instant messaging service from IM(Y) 22.

Hereinabove, one embodiment of the present invention has been described.

In this embodiment, provision of the presence server 5 makes it possible to share presence information of a plurality of instant messaging services. As a result, when a communication partner registers a change of his presence information in any instant messaging service, the change of the presence information is notified to all the instant messaging services. Accordingly, a user using any instant messaging service can know a change of presence information of a communication partner promptly without fail.

Further, the above-described embodiment uses an extended SUBSCRIBE message shown in FIG. 5B. As a result, it is possible to designate details of the object of a change notification request. Namely, only when presence information of an instant messaging service designated in the body part of a message is changed, the presence information in question only is notified using a NOTIFY message. As a result, it is possible to suppress sending and receiving of unnecessary messages.

The present invention is not limited to the above-described embodiment, and can be variously varied within the scope of the invention.

For example, in the above embodiment, the user A uses the client A1, and the client A1 has two instant messaging services, IM(X) 11 and IM(Y) 12. However, IM(X) 11 and IM(Y) 12 may be used in different information apparatuses, respectively. For example, it is possible that the user A uses a personal computer for IM(X) 11 and a mobile phone for IM(Y) 12.

Further, in the above embodiment, the IM(X) server 3, the IM(Y) server 4 and the presence server 5 each have its own presence information table 300 in its presence information storage unit. However, it is possible that only the presence server 5 has the presence information table 300.

What is claimed is:

1. A presence information sharing method for sharing presence information indicating a status of a user using a client application in a system comprising a plurality of service servers providing a different type of service for different types of client applications, respectively, and a presence server that manages the presence information of said user, wherein:
   a processing unit of each of said plurality of service servers executes:
      a reception operation, in which a change of presence information with respect to the service provided by the service server is received from said client application;
      a first change notification sending operation, in which a change notification for notifying the change of the presence information, received in said reception operation, is sent to said presence server; and
      a second change notification sending operation, in which a change notification message for notifying a change of presence information with respect to a service different from the service provided by the service server is received and said change notification message is sent to the client application;
   said presence server includes a processing unit and a storage unit for storing presence information of each user for each service of a plurality of services provided by said plurality of service servers; and
   said processing unit of the presence server executes:
      an update operation, in which said presence information stored in said storage unit is updated based on a change notification message sent from each of said plurality of service servers; and
      a third change notification sending operation, in which a change notification message for notifying the presence information updated in said update operation to service servers that provide services different from the service of the updated presence information.

2. A presence information sharing method according to claim 1, wherein:
   the processing unit of each of said plurality of service servers further executes:
      a notification request reception operation in which a request message for requesting a notification of a change of presence information of a communication partner is received from said client application; and
      a first notification request sending operation in which the request message received in said notification request reception operation is sent to said presence server; and
   the processing unit of said presence server further executes:
      a second notification request sending operation in which the request message sent in said first notification request sending operation is sent to service servers different from the service server that has sent the request message in question.

3. A presence information sharing method according to claim 2, wherein:
   said request message designates a service for which a notification of a change of the presence information of the communication partner is requested.

4. A presence information sharing method according to claim 3, wherein:
   said change notification message notifies a change of the presence information of the service designated in said request message.

5. A computer-readable medium embodying a presence information sharing program implemented by a computer, the presence information sharing program for sharing presence information in a presence information sharing system comprising a plurality of service servers, each of which provides a different type of service for different types of client applications, respectively, and a presence server that manages presence information that indicates a status of a user using said client application, wherein:
   said program makes a processing unit of each of said plurality of service servers execute:
      a reception operation in which a change of presence information with respect to the service provided by the service server concerned is received from said client application;
      a first change notification sending operation in which a change notification for notifying the change of the presence information, received in said reception operation, is sent to said presence server; and
      a second change notification sending operation in which a change notification message for notifying a change of presence information with respect to a service different from the service provided by the service server in question is received and said change notification message is sent to the client application.

6. An instant-messenger (IM) presence information sharing method useable in a system configured to allow plural IM users to exchange personal instant messages via two or more differing IM application software packages, the IM presence information method for sharing IM presence information indicating an IM status of each IM user for each of the two or more differing IM application software packages, the system comprising a plurality of IM service servers each providing an IM service for a differing one of the two or more differing IM application software packages, and a presence server that manages the IM presence information of said each IM user for each of the two or more differing IM application software packages, wherein:
   a processing unit of each of said plurality of IM service servers executes:
      a reception operation, in which a change of IM presence information with respect to active use of the IM service provided by the IM service server is received from said IM client application;
      a first change notification sending operation, in which a first IM change notification for notifying the change of the IM presence information of the IM service provided by the IM service server, as received in said reception operation, is sent to said presence server; and
      a second change notification sending operation, in which a second IM change notification message for notifying a change of IM presence information with respect to a differing IM service from the IM service provided by the IM service server, is received, and said second IM change notification message is sent to the IM client application;
   said presence server includes a processing unit and a storage unit for storing IM presence information of said each IM user for each of the two or more differing IM application software packages provided by said plurality of IM service servers; and
   said processing unit of the presence server executes:
      an update operation, in which said IM presence information stored in said storage unit is updated based on an IM change notification message sent from each said IM service server of said plurality of IM service servers; and
      a third change notification sending operation, in which a third IM change notification message for notifying of the IM presence information updated in said update operation is sent to IM service servers that provide a differing IM service from the IM service of the updated IM presence information.

* * * * *